3,393,235
PROCESS FOR THE PREPARATION OF MONOCHLORACETIC ACID
Georges Emile Maurice Boullay, Lyon, France, assignor to Rhone-Poulenc S.A., Paris, France, a corporation of France
No Drawing. Filed July 9, 1965, Ser. No. 470,887
Claims priority, application France, July 22, 1964, 982,649, Patent 1,413,926
3 Claims. (Cl. 260—539)

ABSTRACT OF THE DISCLOSURE

Monochloracetic acid is prepared by oxidizing chloracetaldehyde with aqueous hydrogen peroxide in the absence of a catalyst.

---

This invention relates to the preparation of monochloracetic acid.

Various processes are known for the oxidation of chloracetaldehyde to monochloracetic acid, but these processes have either not given satisfactory results or have been difficult to use on an industrial scale. For example, according to French Patent No. 979,134 and Russian Patent No. 110,145, it is known to oxidize chloracetaldehyde with chlorine, optionally with ultra-violet irradiation. The inherent formation of hydrogen chloride in this process, and the secondary chlorination reaction involving the formation of dichloracetic acid, make thhe process difficult to carry out.

It has also been proposed in French Patent No. 1,024,751 to oxidise chloracetaldehyde with hypohalous acids, but, with these oxidising agents, the yields obtained are less than 70%.

According to Natterer (Mon., 3, 457 (1883)) and Russian Patent No. 119,875, it has been proposed to carry out the oxidation with nitric acid. This reaction, which can be very violent, requires rigorous control of the reaction temperature, and involves the formation of chloronitromethanes, which are toxic.

According to the present invention, a process for the preparation of monochloracetic acid comprises oxidising chloracetaldehyde with hydrogen peroxide in the absence of any catalyst. It is already known (Firth et al., J. Chem. Soc., 1936, 633) to oxidise acetaldehyde to acetic acid with hydrogen peroxide, but this reaction is very slow and even after three hours at 100° C. only 28% of acetic acid has been formed. To accelerate the reaction, it is necessary to use, as catalyst, the toxic selenium oxychloride. Moreover, it is necessary to separate the catalyst at the end of the reaction, which complicates the process. In contrast, chloracetaldehyde is rapidly oxidised to monochloracetic acid with hydrogen peroxide in the absence of any catalyst, so that a clear solution of monochloracetic acid is obtained at the end of the operation.

The chloracetaldehyde can be used in anhydrous form or as the molten semi-hydrate, or as an aqueous solution of any concentration. The hydrogen peroxide, which (as its aqueous solution) is a cheap and readily available oxidising agent, can be used in any concentration, an aqueous solution containing from 20 to 60% by weight being preferred. The amount of hydrogen peroxide used is preferably from 1 to 2 molecules per molecule of chloracetaldehyde.

The reaction temperature is preferably from 60° C., the reflux temperature of the reaction mixture at atmospheric pressure, and is most conveniently the reflux temperature. If desired, the process can be operated at superatmospheric pressure, but this is rarely advantageous.

The new process can be operated either in the absence of any solvent (other than thhe water present in the reactants, or in a solvent such as an alkanoic acid, for example acetic or monochloracetic acid.

To put the process into practice, a reactor is charged with the chloracetaldehyde, and optionally a solvent, and then heated to bring the mixture to a convenient temperature. The quantity of hydrogen peroxide necessary to effect the oxidation is then introduced at regular intervals into the reactor, and the exothermic nature of the reaction maintains the mixture at reflux temperature. The latter temperature increases as the hydrogen peroxide is added. The reaction mixture is held at the temperature reached at the end of the addition until the reaction is complete. The reaction mass can be stirred throughout the reaction either mechanically or by bubbling an inert gas through the mixture. At the end of the reaction, a clear solution of monochloracetic acid in water (and the solvent if any) is obtained, containing a small proportion of dichloracetic acid formed in the course of the reaction. The water may be removed from the solution by distillation, and monochloracetic acid is obtained, contaminated by a small proportion of dichloracetic acid which may be removed by recrystallisation.

The following example illustrates the invention.

EXAMPLE

Into a three-necked, 2-litre round-bottomed flask provided with a thermometer, reflux condenser, dropping funnel, and dip-tube for stirring by passage of nitrogen, chloracetaldehyde semi-hydrate (500 g., 5.71 moles) is charged, and then melted and heated to a temperature of 75° C. by heating on an oil bath. 40% aqueous hydrogen peroxide (591 g., or 120% of theory) is then introduced regularly over 2½ hours. As the reaction is exothermic, the temperature of the mixture is raised to the boiling point and increases during the course of the addition so as finally to attain 102–103° C. The mixture is then heated at this temperature for 1 hour. After this time, determination of chloracetaldehyde with hydrazine sulphate shows that it has practically disappeared. The aqueous solution obtained as concentrated by distillation of the water, and the monochloracetic acid and dichloracetic acid are then separated by crystallization of the residue. The mother liquors resulting from this crystallization are concentrated, and the residue obtained is crystallised. After three successive concentrations and crystallizations, 486 g. of monochloracetic acid melting at 62° C. are obtained, corresponding to a yield of 90%.

I claim:
1. Process for the preparation of monochloracetic acid which comprises contacting chloracetaldehyde with aqueous hydrogen peroxide in a proportion of 1 to 2 molecules of hydrogen peroxide per molecule of chloracetaldehyde at a temperature between 60° C. and the reflux temperature of the reaction mixture and in the absence of a catalyst.
2. Process according to claim 1 in which the chloracetaldehyde is used in the form of its semi-hydrate.
3. Process according to claim 1 in which the hydrogen peroxide has a concentration of 20 to 60% by weight.

References Cited

UNITED STATES PATENTS 3,312,736   4/1967   Ruhf _____ 260—530

FOREIGN PATENTS 682,354   11/1952   Great Britain.

LORRAINE A. WEINBERGER, *Primary Examiner.*
A. P. HALLUIN, *Assistant Examiner.*